(12) United States Patent
Peng et al.

(10) Patent No.: US 9,260,652 B2
(45) Date of Patent: Feb. 16, 2016

(54) METAL DOPED SEMICONDUCTOR NANOCRYSTALS AND METHODS OF MAKING THE SAME

(75) Inventors: Xiaogang Peng, Fayetteville, AR (US); Renguo Xie, Changchun (CN)

(73) Assignee: Board of Trustees of the University of Arkansas, Little Rock, AR (US)

(*) Notice: Subject to any disclaimer, the term of this patent is extended or adjusted under 35 U.S.C. 154(b) by 1048 days.

(21) Appl. No.: 13/381,777

(22) PCT Filed: Jul. 1, 2010

(86) PCT No.: PCT/US2010/040798
§ 371 (c)(1),
(2), (4) Date: Mar. 20, 2012

(87) PCT Pub. No.: WO2011/003003
PCT Pub. Date: Jan. 6, 2011

(65) Prior Publication Data
US 2012/0261624 A1    Oct. 18, 2012

Related U.S. Application Data

(60) Provisional application No. 61/222,229, filed on Jul. 1, 2009.

(51) Int. Cl.
*C09K 11/88*    (2006.01)
*C09K 11/58*    (2006.01)
*C09K 11/62*    (2006.01)
*C09K 11/02*    (2006.01)
*C09K 11/70*    (2006.01)

(52) U.S. Cl.
CPC ............... *C09K 11/02* (2013.01); *C09K 11/70* (2013.01); *C09K 11/883* (2013.01)

(58) Field of Classification Search
CPC ...... C09K 11/0883; C09K 11/62; C09K 11/58
USPC ....................................................... 252/301.4 P
See application file for complete search history.

(56) References Cited

U.S. PATENT DOCUMENTS

2002/0158267 A1    10/2002    Victor
2007/0194279 A1*    8/2007    Peng et al. ............. 252/301.4 F
2007/0215856 A1    9/2007    Kwon et al.

OTHER PUBLICATIONS

Andreev. Eu locations in Eu-doped InGaN/GaN quantum dots. Applied Physics Letters 87, 021906 2005.*
Xie. Colloidal InP Nanocrystals as Efficient Emitters Covering Blue to Near-Infrared. J. Am. Chem. Soc. 2007, 129, 15432-15433 and supplemental.*
Andreev Thomas et al, Eu locations in Eu-doped InGaN/GaN quantum dots, Applied Physics Letters, AIP, vol. 87, No. 2, Jul. 8, 2005, pp. 21906-21906, American Institute of Physics, Melville, NY, US.
Somaskandan et al, Isovalent doping strategy for manganese introduction into III-V diluted magnetic semiconductor nanoparticles: InP:Mn, Chemical Materials, vol. 17, No. 5, Aug. 2, 2005, pp. 1190-1198.

(Continued)

*Primary Examiner* — Matthew E Hoban
(74) *Attorney, Agent, or Firm* — Smith Moore Leatherwood LLP; J. Clinton Wimbish

(57)    ABSTRACT

Doped semiconductor nanocrystals and methods of making the same are provided.

27 Claims, 11 Drawing Sheets

(56) References Cited

OTHER PUBLICATIONS

Prochazkova et al, InP based semiconductor structures for radiation detection, Journal of Materials Science: Materials in Electronics, vol. 19, No. 8-9, Sep. 25, 2007, pp. 770-775, Springer Science+Business Media, LLC.

International Search Report for International Appl. No. PCT/US2010/040798.

* cited by examiner

METAL DOPED SEMICONDUCTOR NANOCRYSTALS AND METHODS OF MAKING THE SAME

RELATED APPLICATION DATA

The present application claims priority pursuant to 35 U.S.C. §119(e) to U.S. Provisional Patent Application Ser. No. 61/222,229, filed Jul. 1, 2009 which is hereby incorporated by reference in its entirety.

U.S. GOVERNMENT RIGHTS

This invention was made with government support under grant number R44 GM069065 awarded by the National Institutes of Health (NIH) and grant number CHE0554812 awarded by the National Science Foundation (NSF). The government has certain rights in the invention.

FIELD OF THE INVENTION

The present invention relates to nanocrystalline materials and, in particular, to doped nanocrystalline materials and methods of making the same.

BACKGROUND OF THE INVENTION

Colloidal semiconductor nanocrystals or quantum dots have generated significant interest for their promise in developing advanced optical materials. Size-dependent emission is attractive property of semiconductor nanocrystals allowing their use in a variety of wavelength dependent applications.

Biological labeling, for example, is expected to be a significant application of semiconductor nanocrystals. Particularly, photoluminescent (PL) quantum dots having emission in the near-infrared (NIR) region of the electromagnetic spectrum (700-1400 nm) are desirable as biological labels for in-vivo imaging because of their large absorption cross section and narrow emission bands. Moreover, semiconductor nanocrystals can also find significant application in display technologies, thermoelectrics, telecommunications and signaling, photonics and photovoltaic apparatus.

Nevertheless, the synthetic chemistry of semiconductor nanocrystals, including doped nanocrystals, is challenging and has inspired continuous efforts for developing high performance nanocrystals for use in various applications. Generally speaking, current limitations of these materials include low emission efficiency, low dopant emission characteristics, dopant ejection from nanocrystalline lattices, broad spectrum width, poor color control and/or poor stability.

SUMMARY

In view of the foregoing limitations, doped semiconductor nanocrystals are described herein, which, in some embodiments, demonstrate advantageous properties.

In one aspect, the present invention provides a semiconductor nanocrystal comprising a dopant, the semiconductor nanocrystal having a dopant photoluminescence (PL) or emission at a wavelength greater than about 610 nm. In another embodiment, a doped semiconductor nanocrystal has a dopant photoluminescence or emission at a wavelength greater than about 620 nm. In some embodiments, a doped semiconductor nanocrystal described herein has a dopant photoluminescence or emission at a wavelength ranging from about 620 nm to about 1150 nm.

In some embodiments, a dopant of a doped semiconductor nanocrystal provides a plurality of photoluminescence or emission bands. Moreover, in some embodiments, doped semiconductor nanocrystals described herein do not exhibit or do not substantially exhibit self-quenching by absorption of the dopant photoluminescence or emission by the host material.

In having a dopant photoluminescence ranging from about 620 nm to about 1150 nm, doped semiconductor nanocrystals described herein, in some embodiments, can find use in NIR applications including, but not limited to, biological imaging, telecommunications and signaling, photonics and photovoltaic devices.

In some embodiments, a doped semiconductor nanocrystal having a dopant photoluminescence at a wavelength greater than about 610 nm comprises a host semiconductor material comprising a II/VI compound or a III/V compound. Groups II, III, V, and VI, as used herein, refer to Groups IIB, IIIA, VA, and VIA of the periodic table according to the American CAS designation. For example Group IIB corresponds to the zinc family, Group IIIA corresponds to the boron family, Group VA corresponds to the nitrogen family and Group VIA corresponds to the chalcogens.

Moreover, in some embodiments, the dopant of the semiconductor nanocrystal comprises a metal, including one or more transition metals. In other embodiments, the dopant comprises a non-metal.

Additionally, in some embodiments, all or substantially all of the photoluminescence from doped semiconductor nanocrystals described herein results from dopant emission. In one embodiment, for example, at least about 90% of the photoluminescence of doped semiconductor nanocrystals described herein results from dopant emission. In another embodiment, at least about 95% of the photoluminescence of the doped nanocrystals results from dopant emission. In some embodiments, at least about 99% of the photoluminescence of the doped nanocrystals results from dopant emission. In some embodiments, a doped semiconductor nanocrystal described herein demonstrates no or substantially no bandgap emission from the II/VI or III/V host semiconductor material.

In some embodiments, doped semiconductor nanocrystals described herein have a photoluminescent quantum yield (PL QY) of up to about 40%. Doped semiconductor nanocrystals, in some embodiments, have a PL QY of at least about 10%. In some embodiments, doped semiconductor nanocrystals have a PL QY ranging from about 1% to about 40%. In some embodiments doped semiconductor nanocrystals have a quantum yield ranging from about 5% to about 20%.

In another aspect, the present invention provides a nanocrystal comprising a first semiconductor material having a dopant disposed therein and a diffusion barrier at least partially surrounding the doped semiconductor material. In some embodiments, the first semiconductor material provides a core of the nanocrystal. Moreover, in some embodiments, the diffusion barrier inhibits or precludes diffusion of the dopant from the first semiconductor material. A dopant, in some embodiments, comprises a metal, including transition metals. In other embodiments, a dopant comprises a non-metal.

The first host semiconductor material, in some embodiments, comprises a II/VI compound, a III/V compound or a group IV material.

Additionally, in some embodiments, the diffusion barrier comprises a second semiconductor material. The second semiconductor material, in some embodiments, comprises a II/VI compound or a III/V compound. Moreover, in some embodiments, the diffusion barrier comprises a plurality of monolayers of a II/VI compound or a III/V compound. In some embodiments, for example, the diffusion barrier comprises 2-20 monolayers of a II/VI compound or a III/V compound.

In some embodiments, the first semiconductor material and the second semiconductor material are different. In other embodiments, the first semiconductor material and the second semiconductor material are the same.

A nanocrystal comprising a first semiconductor material having a dopant disposed therein and a diffusion barrier at least partially surrounding the doped semiconductor material, in some embodiments, can have any of the photoluminescence properties described herein.

In a further aspect, methods of producing doped semiconductor nanocrystals are provided. In one embodiment, a method of producing doped semiconductor nanocrystals comprises (a) combining a metal precursor, a ligand and a solvent to form a metal-ligand complex in a reaction vessel, (b) admixing an anionic precursor with the metal-ligand complex at a first temperature sufficient to form host semiconductor nanocrystals, (c) admixing a dopant with the host semiconductor nanocrystals to provide a reaction mixture and (d) heating the reaction mixture to a second temperature to provide host semiconductor nanocrystals having the dopant disposed therein. In being disposed in the semiconductor nanocrystals, the dopant, in some embodiments, does not reside or substantially reside at the surface of the nanocrystals. In some embodiments, for example, the dopant is incorporated into or resides within the lattice of the host II/VI or III/V semiconductor material.

In some embodiments, the metal precursor comprises a group II metal, group III metal or a group IV metal. Moreover, in some embodiments, the anionic precursor comprises a group V element or a group VI element. Accordingly, in some embodiments, the host semiconductor nanocrystals comprise a II/VI compound, a III/V compound or a group IV material.

In some embodiments, the second temperature is less than or greater than the first temperature. The second temperature, in some embodiments, for example, ranges from about 180° C. to about 240° C. In some embodiments, the reaction mixture is heated to the second temperature at a rate of at least 2° C./min.

Methods of producing doped semiconductor nanocrystals, in some embodiments, further comprise forming a diffusion barrier comprising a material $M^1X^1$ on at least one of the doped semiconductor nanocrystals, wherein $M^1$ is a cation and $X^1$ is an anion. In some embodiments, a method of forming a diffusion barrier comprises forming at least one monolayer of a material $M^1X^1$ on at least one of the doped semiconductor nanocrystals by contacting the doped semiconductor nanocrystals, in an alternating manner, with a cation ($M^1$) precursor solution in an amount to form a monolayer of cation, and an anion precursor ($X^1$) in an amount to form a monolayer of anion, wherein $M^1X^1$ comprises a stable, nanometer sized inorganic solid selected from a II/VI compound or a II/VI compound. In some embodiments, a diffusion barrier comprises up to 20 monolayers of $M^1X^1$. In some embodiments, a diffusion barrier comprises greater than 20 monolayers of $M^1X^1$.

In some embodiments, the doped semiconductor nanocrystals are contacted first with the cation precursor solution to provide doped semiconductor nanocrystals with a monolayer of cation. In other embodiments, the doped semiconductor nanocrystals are contacted first with the anion precursor solution to provide the doped semiconductor nanocrystals with a monolayer of anion. In some embodiments, the addition of cation precursor solution and anion precursor solution to a solution of doped semiconductor nanocrystals in an alternating manner results in a solution comprising doped semiconductor nanocrystals comprising a diffusion barrier, the solution also comprising cation precursor solution and anion precursor solution.

In some embodiments, by adding cation precursor and anion precursor in an alternating manner to the reaction vessel comprising doped semiconductor nanocrystals, the doped semiconductor nanocrystals are not washed or otherwise purified between the alternating additions of cation and anion precursor solutions.

These and other embodiments are described in further detail in the detailed description which follows.

DETAILED DESCRIPTION

Figure 1:
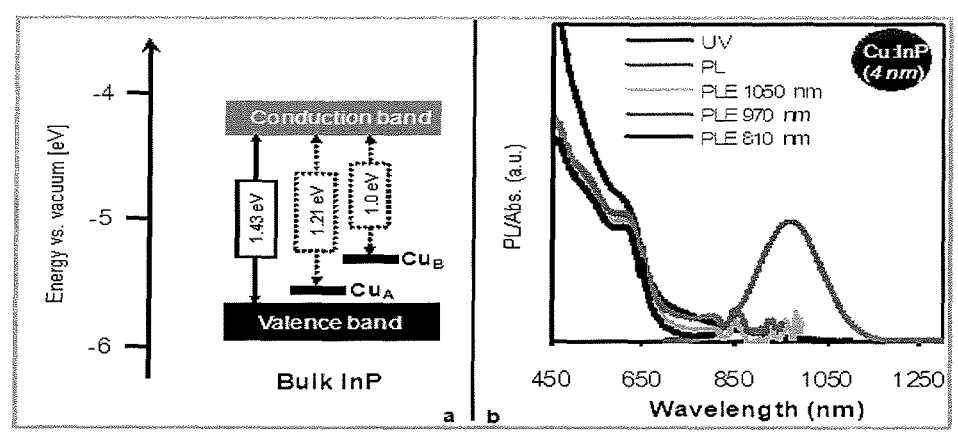
FIG. 1 represents (a) schematic illustration of the energy diagram of Cu-doped bulk InP and (b) UV-Vis, PL and PLE spectra of 4 nm Cu:InP doped nanocrystals according to one embodiment of the present invention.

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

In one aspect, the present invention provides a semiconductor nanocrystal comprising a dopant, the semiconductor nanocrystal having a dopant photoluminescence or emission at a wavelength greater than about 610 nm. In another embodiment, a doped semiconductor nanocrystal has a dopant photoluminescence or emission at a wavelength greater than 620 nm. In some embodiments, a doped semiconductor nanocrystal described herein has a dopant photoluminescence or emission at a wavelength ranging from about 620 nm to about 1150 nm.

In some embodiments, a dopant of a doped semiconductor nanocrystal provides a plurality of photoluminescence or emission bands. In some embodiments, two or more of the dopant emission bands overlap. In some embodiments, two or more of the dopant emission bands do not overlap. Moreover, in some embodiments, doped semiconductor nanocrystals described herein do not exhibit or do not substantially exhibit self-quenching by absorption of the dopant photoluminescence or emission by the host material. In some embodiments, for example, a host II/VI or III/V semiconductor material has a bandgap greater than the emission band of the dopant, thereby reducing or precluding quenching of the dopant emission by the host semiconductor material.

In having a dopant photoluminescence ranging from about 620 nm to about 1150 nm, doped semiconductor nanocrystals described herein, in some embodiments, can find use in NIR applications including, but not limited to, biological imaging, telecommunications and signaling, photonics and photovoltaic devices.

In some embodiments, a doped semiconductor nanocrystal having a dopant photoluminescence or emission at a wavelength greater than about 610 nm comprises a host semiconductor material comprising a II/VI compound or a III/V compound. In one embodiment, for example, a doped semiconductor nanocrystal comprises an InP host material. In some embodiments, a host semiconductor material does not comprise a II/VI material. In some embodiments, a host semiconductor material does not include or does not substantially include cadmium.

Moreover, in some embodiments, the dopant of the semiconductor nanocrystal comprises a metal, including one or more transition metals. In some embodiments, transition metals comprise Ti, Zr, Hf, V, Nb, Ta, Cr, Mo, W, Mn, Tc, Re, Fe, Ru, Os, Co, Rh, Ir, Ni, Pd, Pt, Cu, Ag or Au or combinations thereof. In other embodiments, the dopant comprises a non-metal.

A dopant, in some embodiments, is present in the semiconductor nanocrystal in an amount up to about 50 weight percent (atomic). In another embodiment, a dopant is present in the semiconductor nanocrystal in an amount ranging from about 1 weight percent to about 30 weight percent. In some embodiments, a dopant is present in a semiconductor nanocrystal in an amount ranging from about 5 weight percent to about 20 weight percent.

Additionally, in some embodiments, all or substantially all of the photoluminescence from doped semiconductor nanocrystals described herein results from dopant emission. In one embodiment, for example, at least about 90% of the photoluminescence of doped semiconductor nanocrystals described herein results from dopant emission. In another embodiment, at least about 95% of the photoluminescence of the doped nanocrystals results from dopant emission. In some embodiments, at least about 99% of the photoluminescence of the doped nanocrystals results from dopant emission. In some embodiments, a doped semiconductor nanocrystal demonstrates no or substantially no bandgap emission from the II/VI or III/V host semiconductor material.

In some embodiments, doped semiconductor nanocrystals described herein have a PL QY of up to about 40%. Doped semiconductor nanocrystals, in some embodiments, have a PL QY of at least about 10%. In some embodiments, doped semiconductor nanocrystals have a PL QY ranging from about 1% to about 40%. In some embodiments doped semiconductor nanocrystals have a quantum yield ranging from about 5% to about 20%.

In another aspect, the present invention provides a nanocrystal comprising a first semiconductor material having a dopant disposed therein and a diffusion barrier at least partially surrounding the doped semiconductor material. In some embodiments, the first semiconductor material provides a core of the nanocrystal. Moreover, in some embodiments, the diffusion barrier inhibits or precludes diffusion of the dopant from the first semiconductor host material. A dopant, in some embodiments, comprises a metal, including transition metals. In other embodiments, a dopant comprises a non-metal.

The first semiconductor host material, in some embodiments, comprises a II/VI compound, a III/V compound or a group IV material. As provided herein, in some embodiments, the first semiconductor material does not comprise a II/VI compound. In some embodiments, a nanocrystal comprising a first semiconductor material having a dopant disposed therein and a diffusion barrier at least partially surrounding the doped semiconductor material does not include or does not substantially include cadmium.

Additionally, in some embodiments, the diffusion barrier comprises a second semiconductor material. The second semiconductor material, in some embodiments, comprises a II/VI compound or a III/V compound. Moreover, in some embodiments, the diffusion barrier comprises a plurality of monolayers of a II/VI compound or a II/VI compound. A diffusion barrier can comprise any desired number of monolayers of a II/VI compound or a III/V compound not inconsistent with the objectives of the present invention. In some embodiments, for example, the diffusion barrier comprises 2-20 monolayers of a II/VI compound or a III/V compound. In other embodiments, the diffusion barrier comprises up to 15 monolayers of a II/VI compound or a III/V compound.

In some embodiments, the first semiconductor material and the second semiconductor material are different. In other embodiments, the first semiconductor material and the second semiconductor material are the same. In some embodiments, for example, the first semiconductor material serving as the host for the dopant comprises a III/V material, and the second semiconductor material of the diffusion barrier comprises a II/VI material. In some embodiments, the first semiconductor material comprises Cu doped InP and the second semiconductor material of the diffusion barrier comprises ZnSe.

A nanocrystal comprising a first semiconductor material having a dopant disposed therein and a diffusion barrier at least partially surrounding the doped semiconductor material, in some embodiments, can have any of the photoluminescence properties described herein. Moreover, in some embodiments, a nanocrystal material comprising a diffusion barrier can comprise a dopant in any of the amounts recited herein.

In some embodiments, doped semiconductor nanocrystals described herein can have any desired size not inconsistent with the objectives of the present invention. In some embodiments, doped semiconductor nanocrystals have an average size less than about 10 nm. In another embodiment, doped semiconductor nanocrystals have an average size less than about 5 nm. In some embodiments, doped semiconductor nanocrystals have an average size ranging from about 1 nm to about 5 nm. Doped semiconductor nanocrystals, in some embodiments, have an average size less than about 1 nm or greater than about 10 nm.

In some embodiments, doped semiconductor nanocrystals described herein are monodisperse or substantially monodisperse. Doped semiconductor nanocrystals, in some embodiments, are in the as-prepared state. In being in the as-prepared state in some embodiments, the doped semiconductor nanocrystals have not been subjected to any purification procedures and/or size selection procedures. In some embodiments, as-prepared doped semiconductor nanocrystals can have any of the properties described herein for doped semiconductor nanocrystals.

In a further aspect, methods of producing doped semiconductor nanocrystals are provided. In one embodiment, a method of producing doped semiconductor nanocrystals comprises (a) combining a metal precursor, a ligand and a solvent to form a metal-ligand complex in a reaction vessel, (b) admixing an anionic precursor with the metal-ligand complex at a first temperature sufficient to form host semiconductor nanocrystals, (c) admixing a dopant with the host semiconductor nanocrystals to provide a reaction mixture and (d) heating the reaction mixture to a second temperature to provide host semiconductor nanocrystals having the dopant disposed therein. In being disposed in the semiconductor nanocrystals, the dopant, in some embodiments, does not reside or does not substantially reside at the surface of the nanocrystals. In some embodiments, for example, the dopant is incorporated into or resides within the lattice of the host II/VI or III/VI material.

In some embodiments, the metal comprises a group II metal, group III metal or a group IV metal. Moreover, in some embodiments, the anionic precursor comprises a group V element or a group VI element. Accordingly, in some embodiments, the host semiconductor nanocrystals comprise a II/VI compound, a III/V compound or a group IV material.

A metal precursor, in some embodiments, can comprise a metal oxide, a metal halide, a metal nitride, a metal ammonia complex, a metal amine, a metal amide, a metal imide, a metal carboxylate, a metal acetylacetonate, a metal dithiolate, a metal carbonyl, a metal cyanide, a metal isocyanide, a metal nitrile, a metal peroxide, a metal hydroxide, a metal hydride, a metal ether complex, a metal diether complex, a metal triether complex, a metal carbonate, a metal phosphate, a metal nitrate, a metal nitrite, a metal sulfate, a metal alkoxide, a metal siloxide, a metal thiolate, a metal dithiolate, a metal disulfide, a metal carbamate, a metal dialkylcarbamate, a metal pyridine complex, a metal bipyridine complex, a metal phenanthroline complex, a metal terpyridine complex, a metal diamine complex, a metal triamine complex, a metal diimine, a metal pyridine diimine, a metal pyrazolylborate, a metal bis(pyrazolyl)borate, a metal tris(pyrazolyl)borate, a metal nitrosyl, a metal thiocarbamate, a metal diazabutadiene, a metal dithiocarbamate, a metal dialkylacetamide, a metal dialkylformamide, a metal formamidinate, a metal phosphine complex, a metal arsine complex, a metal diphosphine complex, a metal diarsine complex, a metal oxalate, a metal imidazole, a metal pyrazolate, a metal-Schiff base complex, a metal porphyrin, a metal phthalocyanine, a metal subphthalocyanine, a metal picolinate, a metal piperidine complex, a metal pyrazolyl, a metal salicylaldehyde, a metal ethylenediamine, a metal triflate compound, or any combination thereof.

Moreover, a ligand suitable for use in methods described herein, in some embodiments, comprises a fatty acid, a fatty amine, a phosphine, a phosphine oxide, a phosphonic acid, a phosphinic acid, a sulphonic acid, or any combination thereof. In some embodiments, a ligand comprises up to about 30 carbon atoms. In another embodiment, a ligand comprises up to about 45 carbon atoms.

In some embodiments, the solvent in which the metal precursor and ligand are disposed is a coordinating solvent. In other embodiments, the solvent in which the metal precursor and the ligand are disposed is a non-coordinating solvent. In one embodiment, a suitable non-coordinating solvent comprises octadecene (ODE). Additional suitable non-coordinating solvents can be generally selected using the following guidelines. Suitable non-coordinating solvents, in some embodiments, should have a melting point less than about 25° C. and a boiling point greater than about 250° C. Moreover, reactants and products alike, in some embodiments, should be soluble and stable in the selected solvent. In some embodiments, the second temperature is less than or greater than the first temperature. The second temperature, in some embodiments, for example, ranges from about 170° C. to about 240° C. The second temperature, in some embodiments, ranges from about 175° C. to about 230° C. or from about 180° C. to about 220° C. In another embodiment, the second temperature ranges from about 185° C. to about 200° C.

In some embodiments, the reaction mixture is heated to the second temperature at a rate of at least 2° C./min.

Methods of producing doped semiconductor nanocrystals, in some embodiments, further comprise forming a diffusion barrier comprising a material $M^1X^1$ on at least one of the doped semiconductor nanocrystals, wherein $M^1$ is a cation and $X^1$ is an anion. In some embodiments, a method of forming a diffusion barrier comprises forming at least one monolayer of a material $M^1X^1$ on at least one of the doped semiconductor nanocrystals by contacting the doped semiconductor nanocrystals, in an alternating manner, with a cation ($M^1$) precursor solution in an amount to form a monolayer of cation, and an anion precursor ($X^1$) in an amount to form a monolayer of anion, wherein $M^1X^1$ comprises a stable, nanometer sized inorganic solid selected from a II/VI compound or a III/V compound. In some embodiments, a diffusion barrier comprises up to 15 monolayers of $M^1X^1$. In some embodiments, a diffusion barrier comprises greater than 15 monolayers of $M^1X^1$. Additionally, in some embodiments, a cation precursor comprises a metal precursor described herein.

In some embodiments, the doped semiconductor nanocrystals are contacted first with the cation precursor solution to provide doped semiconductor nanocrystals with a monolayer of cation. In other embodiments, the doped semiconductor nanocrystals are contacted first with the anion precursor solution to provide the doped semiconductor nanocrystals with a monolayer of anion. In some embodiments, the addition of cation precursor solution and anion precursor solution to a solution of doped semiconductor nanocrystals in an alternating manner results in a solution comprising doped semiconductor nanocrystals comprising a diffusion barrier, the solution also comprising cation precursor solution and anion precursor solution.

In some embodiments, by adding cation precursor and anion precursor in an alternating manner to the reaction vessel comprising doped semiconductor nanocrystals, the doped semiconductor nanocrystals are not washed or otherwise purified between the alternating additions of cation and anion precursor solutions.

In some embodiments, monolayers of a diffusion barrier can be deposited on doped core nanocrystals according to methods set forth in U.S. patent application Ser. No. 10/763, 068, which is hereby incorporated by reference in its entirety.

Additionally, in some embodiments, forming a diffusion barrier on at least one of the doped semiconductor nanocrystals further comprises diffusing or ejecting a portion of the dopant from the at least one semiconductor nanocrystal.

In some embodiments, doped semiconductor nanocrystals described herein, including doped semiconductor nanocrystals comprising a diffusion barrier, are prepared in a single reaction vessel without purification, washing or separation between synthesis steps resulting in a one-pot synthetic procedure.

Embodiments of the present are further illustrated in the following non-limiting examples.

EXAMPLE 1

Preparation and Characterization of Doped Semiconductor Nanocrystals

I. Synthesis of Cu Doped InP Semiconductor Nanocrystals

Materials: Technical grade (90%) Octadecene (ODE), Indium acetate $(In(Ac)_3$, 99.99%), Tri-n-octylphosphine (TOP, 97%), Stearic acid (SA, 98%), oleic acid (90%), Zinc stearate (12.5-14%), Tris-trimethylsily phosphine $(P(TMS)_3$, 95%) 1-octylamine (99%) were purchased from Alfa. Oleylamine (97%), were purchased from Adrich. Copper stearate was prepared in lab. All the chemicals were used without further purification.

The injection solution of P precursor was prepared by mixing 0.2 mmol tris-trimethylsilyl phosphine and 2.4 mmol in ODE (1.5 ml in total) in a glove box. Indium acetate (0.4 mM), myristic acid (1.4 mM) and 4 g of 1-octadecene (ODE) were loaded into a three-neck flask. The resulting mixture was heated to 188° C. under argon flow, and the P precursor solution was injected into the reaction mixture in the 3-neck flask, which brought the reaction temperature down to 178° C. for 10 min. The reaction mixture was further cooled to 130° C., and the copper precursor solution (0.02 mmol copper stearate in ODE) was added into the reaction mixture. The reaction mixture was further heated to 210° C. for the doping of InP nanocrystals with Cu ions with a heating rate being about 2° C./min.

The process was monitored through UV-Vis and PL measurements by taking aliquots from the reaction mixture at a given time/temperature dissolved in toluene. Several chosen aliquots were further examined using TEM, EDX, and electron diffraction. EDX was performed after the aliquots were purified by ethanol. The same purification procedure was performed for the doped core/diffusion barrier samples for EDX measurements. For the growth of Cu:InP/ZnSe doped core/diffusion barrier nanocrystals, the reaction mixture was used directly without isolation (see details below). For XRD measurements, the reaction mixture was allowed to cool down to room temperature, purified by adding ethanol into solution, and the solid product was finally isolated by centrifugation, decantation, and drying under Ar flow.

II. Synthesis of Cu:InP/ZnSe Doped Core/Diffusion Barrier Nanocrystals

For the epitaxial growth of a ZnSe diffusion barrier on Cu doped InP nanocrystals, the reaction mixture comprising Cu doped InP nanocrystals made in (I) above was cooled to 150° C. Zinc stearate (0.1 M in ODE) and selenium (0.1 M in TOP) precursor solutions (1.2 ml each) were separately and alternately added into the three-neck reaction flask, with 10 min time interval between the two injections at 150° C. The temperature of the resulting reaction mixture was increased to 220° C. for 30 min to allow the growth of ZnSe diffusion barrier on the Cu doped InP nanocrystals. The reaction mixture was again cooled to 150° C. for the alternate addition of the cation and anion precursor solutions (1.65 ml each for the second run of SILAR), and was heated up to 220° C. for 30 min to grow an additional monolayer of ZnSe diffusion barrier. Similarly, for the third (2.1 ml of each precursor solution), fourth (2.8 ml of each precursor solution), and fifth (3.5 ml of each precursor solution) application of ZnSe diffusion barrier growth, the temperature was adjusted following the same "thermal cycling" settings, 150° C. for the alternate addition of the precursor solutions and 220° C. for the growth of the diffusion barrier monolayer. The entire diffusion barrier growth process was monitored by taking aliquots for UV-Vis, PL. TEM, electron diffraction and EDX measurements. When the diffusion barrier synthesis was complete, the reaction was allowed to cool to room temperature.

For purification, 10 mL of hexane was added to the reaction solution, and the unreacted starting materials and byproducts were removed by successive methanol extractions until the methanol phase was clear. The solid form of the Cu:InP/ZnSe doped core/diffusion barrier semiconductor nanocrystals were isolated by the addition of acetone into the purified hexanes/ODE solution, centrifugation, decantation, and drying under Ar flow.

III. Characterization of Cu:InP Doped Nanocrystals and Cu:InP/ZnSe Doped Core/Diffusion Barrier Nanocrystals The Cu:InP doped nanocrystals and Cu:InP/ZnSe doped core/diffusion barrier nanocrystals were characterized as follows.

The effects of dopant concentration: were studied using the same procedure described in the above sections except a different amount of the Cu precursor was added into the reaction solution at 180° C. for UV-vis and PL measurements. Thermal Stability of Doped Semiconductor Nanocrystals and Undoped Semiconductor Nanocrystals: Purified Cu:InP/ZnSe and InP/ZnSe nanocrystals were dispersed in ODE, and the solutions were heated from room temperature to various temperatures, up to 300° C., under argon. Digital pictures were taken with a fixed position and elimination conditions for a given sample in the flask. The PL spectra at different temperatures were taken in situ using a temperature control unit (up to 80° C.) attached to a Spex Fluorolog-3 fluorometer. Transmission Electron Microscopy (TEM) and High resolution TEM (HR-TEM): The low-resolution TEM images were taken on a JEOL 100CX transmission electron microscope with an acceleration voltage of 100 kV. Carbon-coated copper grids were dipped in the hexanes or toluene solutions to deposit nanocrystals onto the film. High-resolution TEM (HRTEM) pictures were taken using a Taitan microscope with an acceleration voltage of 300 kV.

The PL QY Measurement of Doped Semiconductor Nanocrystals: There is no reference dye for doped semiconductor nanocrystals due to their unusually large Stokes shift. Therefore, InAs quantum dots were used as the intermediate reference. The PL QY of the Cu:InP semiconductor nanocrystals were calculated by the comparison of the fluorescence intensity with InAs QDs with the same optical density at the excitation wavelength and similar fluorescence wavelength. The other measurements: X-ray powder diffraction (XRD) patterns were obtained using a Philips PW 1830 X-ray diffractometer. Energy-Dispersive Spectroscopy (EDS) was used for elemental analysis using a Philips ESEM XL30 scanning electron microscope equipped with a field emission gun and operated at 10 kV. UV-vis spectra were recorded on an HP8453 UV-visible spectrophotometer. Photoluminescence (PL) spectra were taken using a Spex Fluorolog-3 fluorometer.

FIG. 1(a) illustrates the energy diagram of Cu-doped bulk InP demonstrating various pathways of dopant emission. FIG. 1(b) presents UV-Vis, PL and PL excitation (PLE) spectra of Cu:InP nanocrystals (~4 nm in size) grown at 180° C. The InP bandgap PL diminished and the PL spectrum was dominated by a band centered at 950 nm. It should be noticed that the bulk bandgap of InP is 1.43 eV [FIG. 1(a)], or 867 nm, which means that the PL peak in FIG. 1b could not be the bandgap emission of intrinsic InP nanocrystals. The substantial energy gap between the absorption peak and PL peak in FIG. 1(b) further supports that the PL should be the Cu dopant PL. In practice, this large energy gap is the basis of zero self-quenching of the Cu:InP nanocrystals because negligible re-absorption can occur for the nanocrystals.

PLE measurements [FIG. 1(b)] indicated that PL at different wavelengths in the broad band had similar excitation spectra, which means that this broad band was indeed not due to the size distribution of the nanocrystals. This further supports the broadening due to the co-existence of both Cu A and Cu B bands in a PL spectrum of Cu:InP nanocrystals.

Also consistent with this, the full width at half maximum of the PL spectrum in FIG. 2(b) (0.24 eV) was close to the energy difference between Cu A and Cu B energy levels (0.21 eV). With this evidence, one would conclude that it might be difficult to synthesize Cu:InP doped nanocrystals with a PL band as narrow as that of an intrinsic InP nanocrystal (quantum dot) sample.

Figure 2:
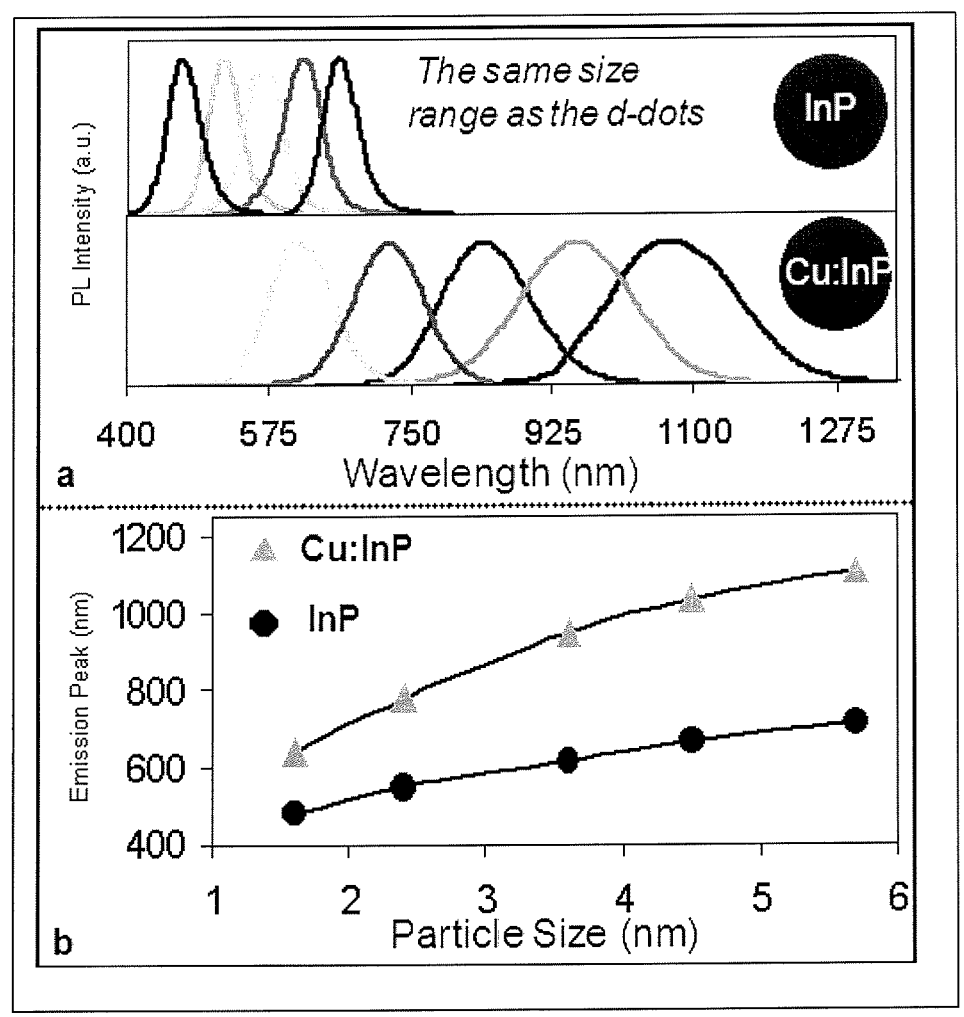
FIG. 2 represents (a) PL spectra and (b) PL peak positions of differently sized InP quantum dots and Cu:InP doped nanocrystals according to one embodiment of the present invention.

According to these results, it is believed the broad PL band [FIG. 1(a) and FIG. 2, top panel] of Cu:InP doped nanocrystals implies that at 180° C., both Cu A and Cu B bands [FIG. 1(a)] were activated. This temperature is substantially lower than 300° C. for observing any Cu dopant PL (only the Cu A band) and 600° C. for obtaining both Cu A and Cu B bands in bulk InP.

Color-tunable Cu dopant PL in the red and NIR windows for Cu:InP doped nanocrystals was realized by changing the size of InP host nanocrystals (FIG. 2). This optical window, from 630 to 1100 nm, compensates the missing emission wavelength of the current existing high performance non-cadmium doped semiconductor nanocrystal emitters, which ended at 610 nm. Furthermore, the wavelength window of the Cu:InP doped nanocrystals also covers the entire NIR window interested for in vivo imaging in various bio-medical applications. For such applications, it would be ideal to have a relatively small physical size of the nanocrystals (<10 nm) for a better physical permeability, which, in some embodiments, is readily achievable with these relatively small Cu:InP doped nanocrystals. (FIG. 2, bottom)

For comparison, the PL spectra of the intrinsic InP quantum dots in the same size range as the Cu doped InP nanocrystals are also presented in FIG. 2(a). The two sets of PL spectra in FIG. 2(a) not only illustrate the peak position and width difference between the Cu doped InP nanocrystals and undoped InP quantum dot emitters but also reveal a possibility to cover nearly the entire visible and NIR optical window by InP based nanocrystals, approximately from about 450 nm to 1100 nm.

Figure 3:
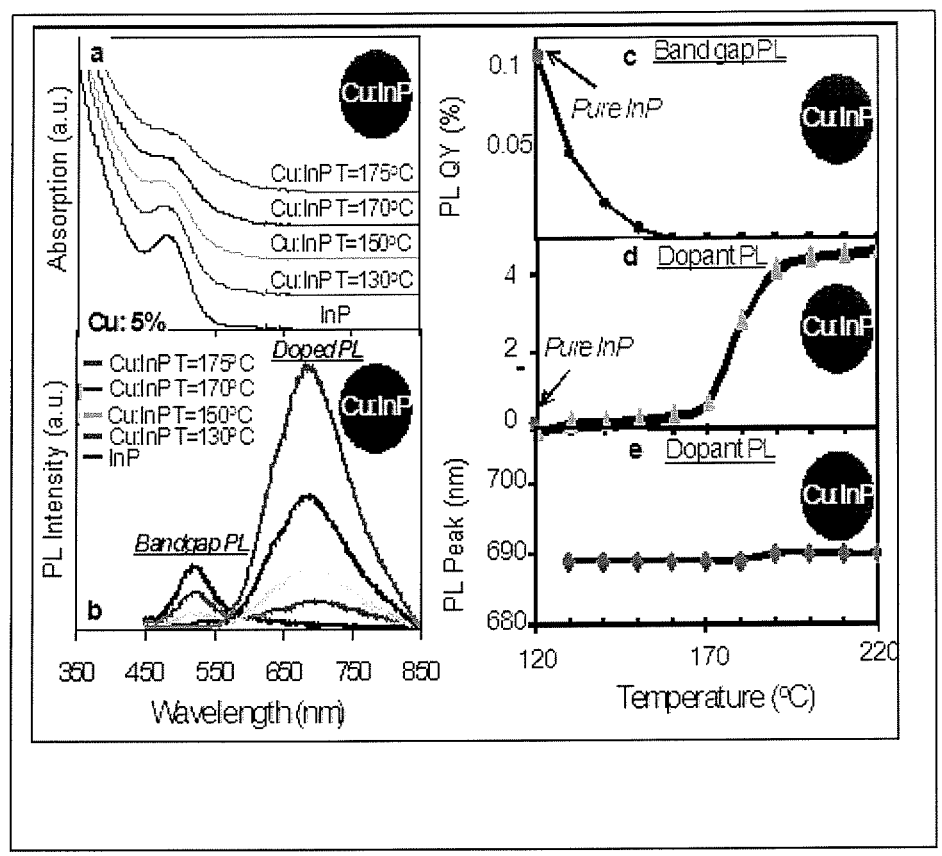
FIG. 3 represents (a) UV-vis, (b) PL spectra, (c) InP bandgap PL quantum yield, (d) Cu dopant PL quantum yield and (e) Cu dopant PL peak position of Cu:InP doped nanocrystals at different reaction temperatures according to one embodiment of the present invention.

FIGS. 3(a) and (b) illustrate the temporal evolution of UV-Vis and PL spectra for a Cu doping reaction with the average size of the intrinsic InP host nanocrystals being about 1.8 nm and UV peak position at about 470 nm. As the reaction proceeded, the first excitonic absorption peak of the intrinsic InP host nanocrystals became less pronounced gradually disappeared although the peak position did not change. Simultaneously, a tail at the long wavelength side of the first excitonic peak appeared.

The TEM measurements revealed there was no significant size and size distribution variation in such a process using large InP nanocrystals. Furthermore, similar spectroscopic changes were reproducibly detected even at room temperature upon the addition of copper precursors into the InP host nanocrystal solution, again without changing the size distribution of the nanocrystals. Such spectroscopic changes are consistent with electronically doping semiconductor nanocrystals. Thus, one tentative explanation of such spectroscopic changes could be a result of replacing trivalent indium ions by bivalent copper ions.

Figure 11:
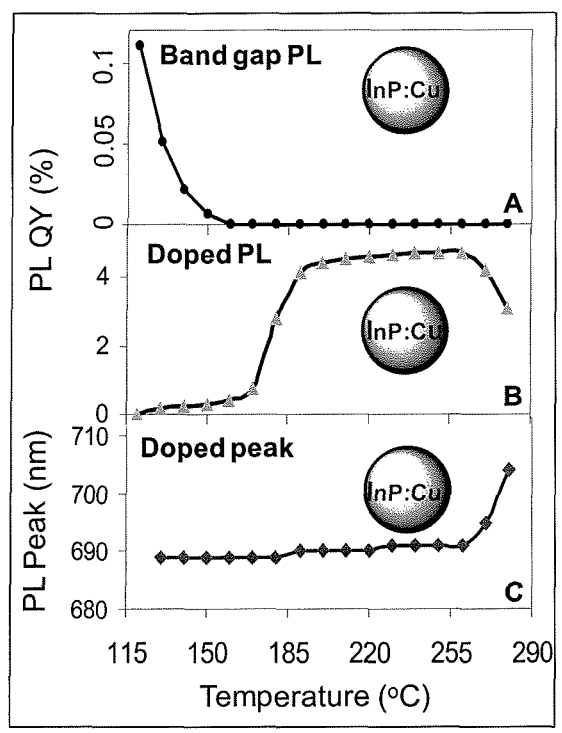
FIG. 11 illustrates PL spectra, quantum yield and PL peak position of Cu:InP doped nanocrystals according to one embodiment of the present invention.

All of the changes in UV-Vis absorption spectra mentioned in the above paragraph were accompanied by the decrease of the intensity of the bandgap PL without changing the PL peak position and peak width [FIG. 3(b)]. Consistent with the results in FIG. 8 discussed further herein, the broad dopant PL peak started to increase its intensity as diminishing of the bandgap PL of the host InP nanocrystals decreased, and the dramatic intensity increase of the dopant PL occurred [FIG. 3(d)]. FIG. 11 additionally demonstrates the disappearance of the InP bandgap emission and the appearance of the dopant emission from Cu.

Figure 8:
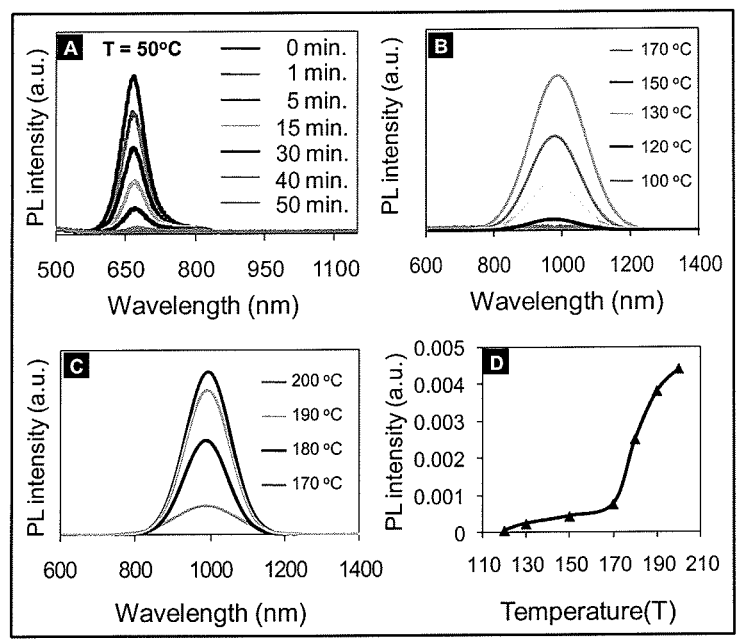
FIG. 8 represents (A) PL spectra of Cu:InP doped nanocrystals with a 5% doping at different time intervals at a temperature of 50° C., (B) and (C) PL spectra of the sample (A) at different temperatures and (D) the corresponding quantum efficiencies according to one embodiment of the present invention.

The results shown in FIG. 8 indicate that the surface adsorption of Cu ions onto the InP host nanocrystals occurred at room temperature in the current system. In the experiment shown in FIG. 8, surface adsorption completed within 50 minutes at 50° C., indicated by the complete quenching of the InP bandgap PL. However, lattice incorporation did not occur until the temperature was higher than about 110° C. (FIG. 8), which resulted in the gradual appearance of the Cu dopant PL. In the temperature between 175 and 200° C., a dramatic increase of the dopant PL intensity was observed, which was found to be even about 1-2 magnitudes higher than that of the original bandgap PL of the corresponding intrinsic InP nanocrystals [See FIGS. 3(c) and 3(d) for quantitative comparison].

After the sharp increase in intensity, the dopant PL became stable until the temperature reached about 255° C. At 255° C. (data not shown), the dopant PL intensity started to decrease, the peak position shifted to red, and UV-Vis absorption spectrum became featureless, which all indicated the occurrence of Ostwald ripening in this high temperature range.

The results discussed in the above paragraph not only provided Cu:InP doped nanocrystals with a relatively high PL brightness, about 45 times brighter than that of the bandgap PL of the original InP host nanocrystals [FIGS. 3(c) and 3(d)], but also revealed that the dramatic dopant PL increase between 175 and 200° C. This further indicates that this step is an intrinsic step and could be decoupled from the surface adsorption and lattice incorporation steps. If this step should be the lattice diffusion of the dopant ions, it also means that the critical temperature for lattice diffusion for Cu:InP doped nanocrystal systems would be about 180-190° C., which is substantially lower than that for both Cu:ZnSe and Mn:ZnSe d-dots systems, in the range between 220 and 260° C.

Figure 4:
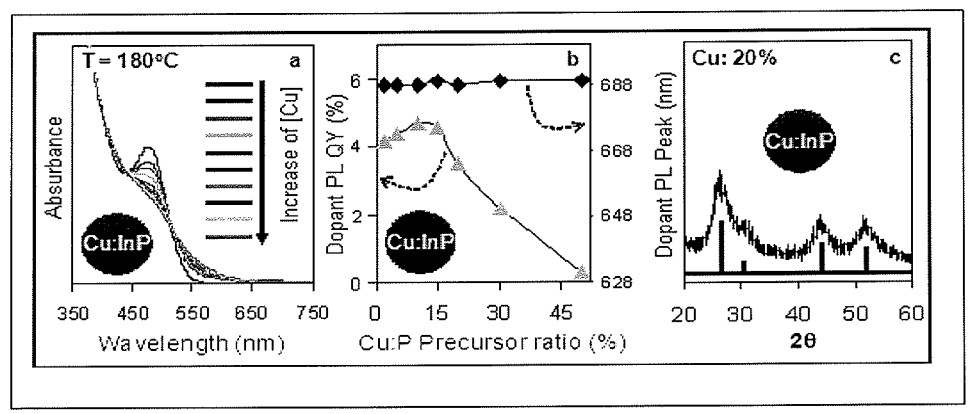
FIG. 4 represents (a) UV-vis absorption spectra of Cu:InP doped nanocrystals with different copper concentration, (b) the dopant PL QY and peak position of the corresponding samples in (a), and (c) XRD pattern of Cu:InP doped nanocrystals with a doping level of 20% according to one embodiment of the present invention.

The effects of dopant concentration on the optical properties of doped nanocrystals were studied systematically under the same reaction conditions (FIG. 4). FIG. 4(a) illustrates the UV-Vis spectra of Cu:InP doped nanocrystals formed by varying the Cu:P precursor ratio at 180° C. By increasing the relative concentration of Cu precursor in the solution, the first excitonic absorption peak of the intrinsic InP host quantum dots [the black line in FIG. 5(a)] demonstrated increased smearing. At the same time, the long tail at the long wavelength side appeared in FIG. 3(a) became more pronounced. These trends were noticed to be consistent with the features associated with electronic doping of semiconductor nanocrystals as discussed above [See, FIG. 3(a)].

While the dopant PL peak position and spectral contour were found be independent of the Cu precursor concentration in the solution, the PL QY showed a maximum at about 10% of Cu concentration (relative to the initial concentration of P precursor, the limiting reagent in the system for the formation of InP host nanocrystals) as shown in FIG. 4(b). Energy dispersive spectroscopy (EDS) measurements revealed that the atomic composition of the resulting Cu:InP doped nanocrystals had a similar value as the ratios of the precursors. The size of the InP host nanocrystals used in this set of experiments were about 1.8 nm in size, which has about 55 InP structural units in each nanocrystal. 10% of dopant level means about 5-6 dopant ions per nanocrystal in average.

Figure 5:
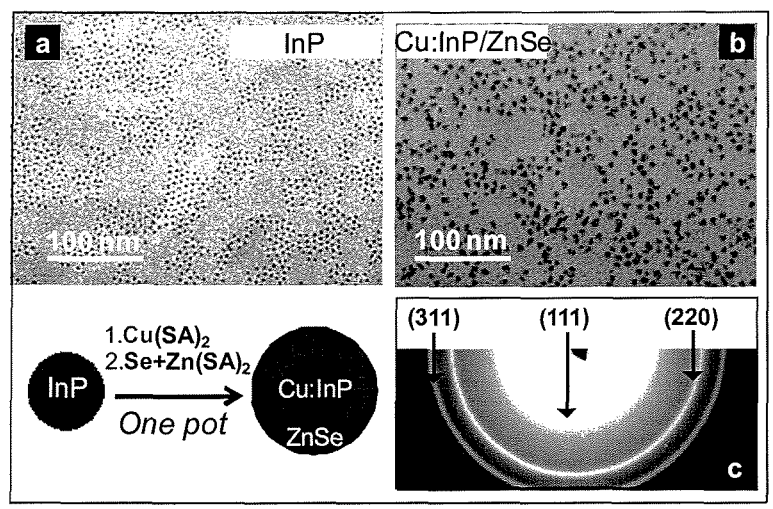
FIG. 5 provides TEM images of (a) InP core and (b) Cu:InP/ZnSe doped core/diffusion barrier nanocrystals and (c) electron diffraction pattern of the sample associated with (b) according to one embodiment of the present invention.

A high level of dopants was usually hard to reach and may change the lattice structure of the host materials. To confirm an intact crystal lattice of the InP host nanocrystals, a XRD pattern of a Cu:InP doped nanocrystal sample prepared as described herein with a relatively high doping level, 20%, is shown in FIG. 5(c). For comparison, the diffraction peaks of bulk InP crystals were marked as solid lines in FIG. 5(c). The Cu:InP doped nanocrystal diffraction pattern matched well with that of the bulk InP, which indicated that a high level of Cu doping did not change the lattice structure of the host InP nanocrystals. For different dopant levels, electron diffraction patterns were examined routinely and the resulting diffraction patterns were found also to be consistent with that of cubic InP crystal lattice.

Figure 9:
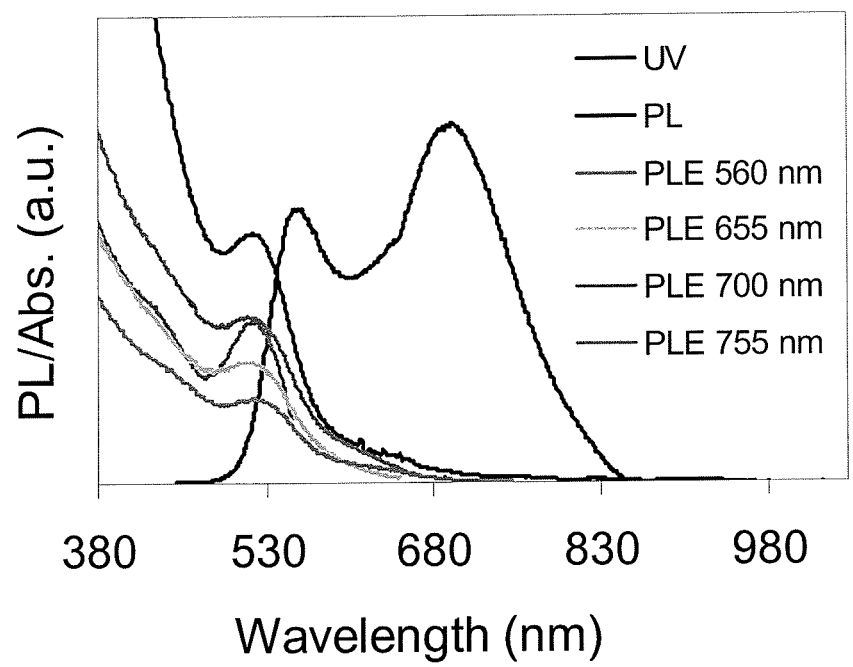
FIG. 9 represents UV-Vis-NIR, PL and PLE spectra of Cu:InP/ZnSe doped core/diffusion barrier nanocrystals with a 5% doping according to one embodiment of the present invention.

The optical properties of the Cu:InP/ZnSe doped core/diffusion barrier nanocrystals were found to be strongly dependent on the Cu dopant concentration in the initial Cu:InP doped core nanocrystals. For a relatively low Cu:P ratio, FIG. 6(a), upon the growth of the ZnSe dopant diffusion barrier, the dopant PL intensity increased initially but started to decrease steadily after the ZnSe diffusion barrier was more than two monolayers. Simultaneously, the intrinsic InP bandgap emission started to appear, FIG. 6(a). It should be pointed out that the appearance of the InP bandgap PL was unlikely the formation of new InP host nanocrystals. As shown in FIG. 9, PLE measurements indicate that both PL peaks in one sample gave almost identical PLE spectra, indicating that both bandgap PL and dopant PL were originated from the same set of InP host nanocrystals. These results suggest that, during the growth of the ZnSe diffusion barrier, some of the Cu:InP doped nanocrystals became InP quantum dots by excluding Cu or ejecting Cu ions from their lattice. This was confirmed by examining the final Cu concentration in the resulting doped core/diffusion barrier nanocrystals [FIG. 6(d) and more discussion below].

The ejection or exclusion of Cu from the InP lattice, in some embodiments, can be solved by introducing more Cu dopant ions into the Cu:InP core host nanocrystals prior to the dopant diffusion barrier epitaxy. FIG. 6(b) demonstrates that the PL spectra of Cu:InP/ZnSe doped core/diffusion barrier nanocrystals after growth of three monolayers of ZnSe diffusion barrier under the same reaction conditions showed systematic reduction of the InP bandgap contribution upon increasing the Cu concentration in the host InP nanocrystals. Significantly, when the Cu concentration increased to 15%, the bandgap InP PL was eliminated completely.

More systematic and quantitative studies on the PL properties of Cu:InP/ZnSe doped core/diffusion barrier nanocrystals are summarized in FIGS. 6(c) and 6(d). At a high Cu concentration (20% of the total cations of the core), the dopant PL QY increased steadily upon the increased ZnSe diffusion barrier thickness, from about 3% to about 35% for this specific reaction. The dopant PL QY of the medium Cu concentration one (10% of the total cations of the core) showed a plateau (~20% PL QY) after two ZnSe diffusion barrier monolayers were grown onto the doped InP nanocrystals. As for the reaction with a low Cu concentration (5% of the total cations of the core), the dopant PL QY actually showed a significant trend of drop after the ZnSe diffusion barrier was thicker than two monolayers. Shown in FIG. 6(b), two reactions with both medium and low Cu concentrations started show a significant bandgap PL for the doped core/diffusion barrier nanocrystals with the growth of three monolayers of ZnSe shell under the elevated temperatures.

The results in FIG. 6(d) revealed that, for all three reactions, the Cu concentration found in the resulting Cu:InP doped nanocrystals, after careful purification from the reaction mixture (see Experimental), decreased steadily as the diffusion barrier thickness increased. This quantitatively confirmed the elimination of Cu dopant ions from the resulting doped core/diffusion barrier nanocrystals. Upon growing five monolayers of ZnSe in average, the Cu concentration dropped for about 50%.

Figure 6:
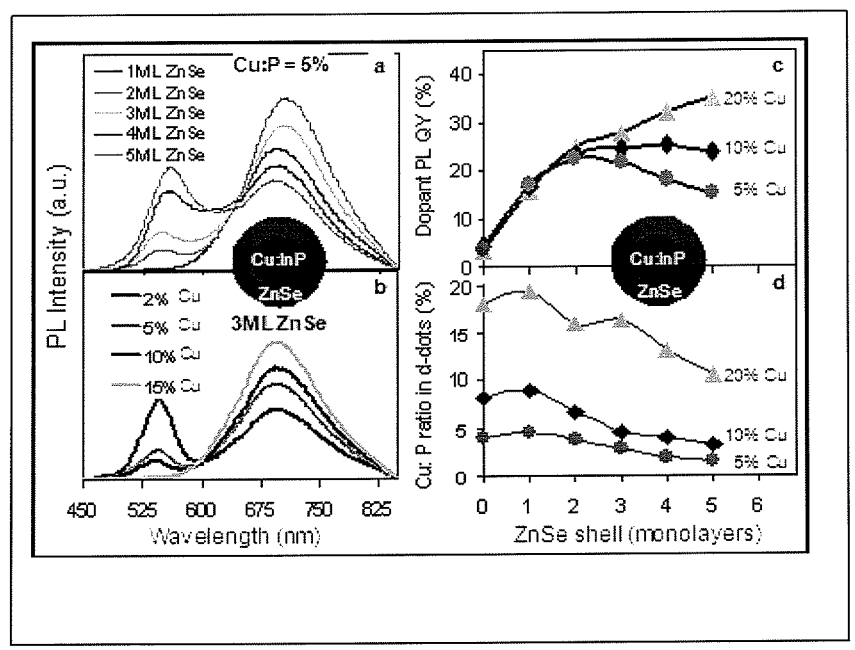
FIG. 6 represents (a) PL spectra of Cu:InP doped nanocrystals (formed with 5% of Cu:P precursor ratio) with different thickness of ZnSe diffusion barriers, (b) PL spectra of Cu:InP/ZnSe core/diffusion barrier doped nanocrystals (three monolayers for ZnSe diffusion barrier) formed with different Cu:P precursor ratios for the Cu:InP cores, (c) dopant PL QY of Cu:InP doped nanocrystals versus the ZnSe diffusion barrier thickness with different initial Cu:P precursor concentrations and (d) the Cu concentration in the Cu:InP/ZnSe doped core/diffusion barrier nanocrystals versus the ZnSe shell thickness with different initial Cu:P precursor concentration according to some embodiments of the present invention.

To summarize the results of FIG. 6, Cu dopant ions were eliminated from the InP nanocrystal lattice upon the growth of the ZnSe diffusion barrier. This elimination could not be avoided because the diffusion barrier growth temperature, 220° C., and a long reaction time were both needed for achieving a decent thickness of the diffusion barrier materials. The reaction temperature is between the critical temperatures of lattice diffusion for Cu:InP and Cu:ZnSe doped nanocrystal systems as discussed above. This means that although ZnSe layers could perform as a diffusion barrier to slow down the elimination of Cu dopants from the doped InP nanocrystals, some additional technique was needed to completely solve this problem. The results in FIG. 6 revealed that this challenge could be solved by using the doped nanocrystals with a high dopant ion concentration. Although the initial dopant PL QY was relatively low with a high dopant concentration [FIG. 4(b) and FIG. 6c], the final dopant PL QY became optimal upon some of the dopant ions were eliminated from the doped nanocrystals.

Figure 7:
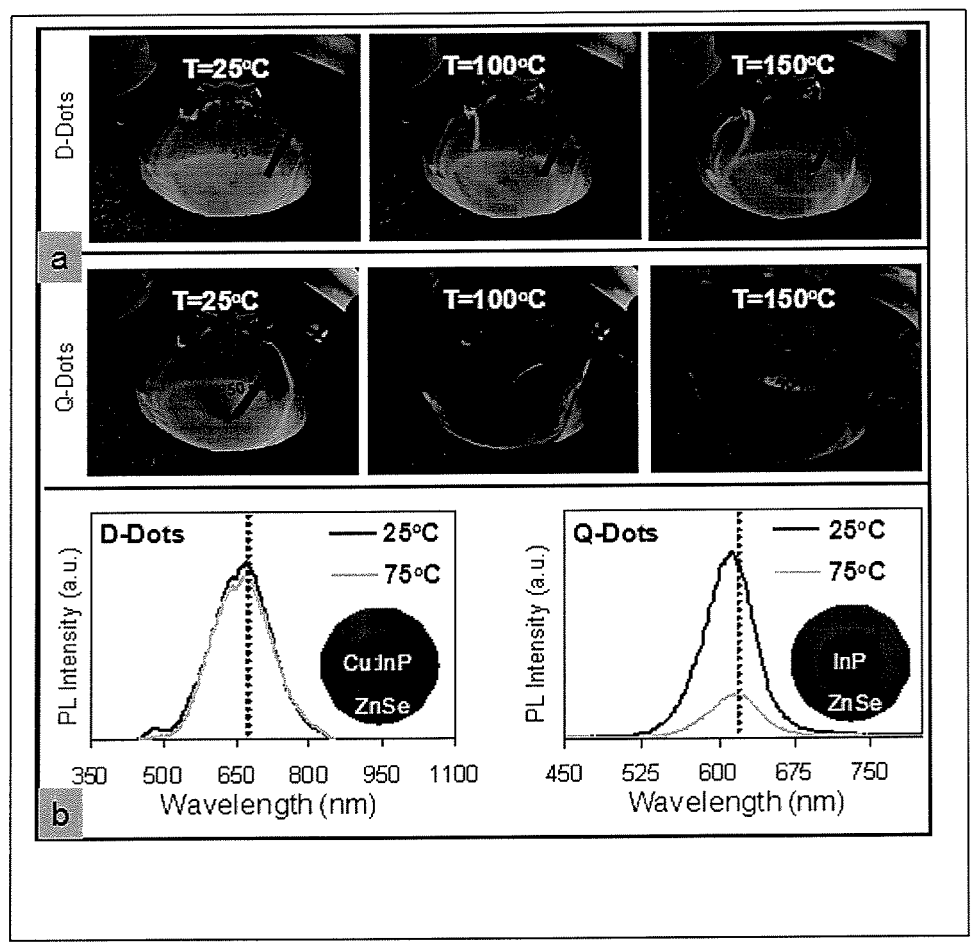
FIG. 7 represents temperature effects on PL of Cu:InP/ZnSe core/diffusion barrier doped nanocrystals compared with InP/ZnSe core/shell nanocrystals shown by (a) visual observation and (b) spectroscopic quantification according to some embodiments of the present invention.

Thermal stability of Cu dopant PL of Cu:InP/ZnSe doped core/diffusion barrier nanocrystals was investigated using InP/ZnSe core/shell quantum dots as the reference (FIG. 7). As described herein, one of the emission levels for the dopant PL is associated with the Cu atomic levels [FIG. 1(a)] and it should thus be less coupled with lattice vibration in comparison to the excitonic PL of InP quantum dots.

Figure 10:
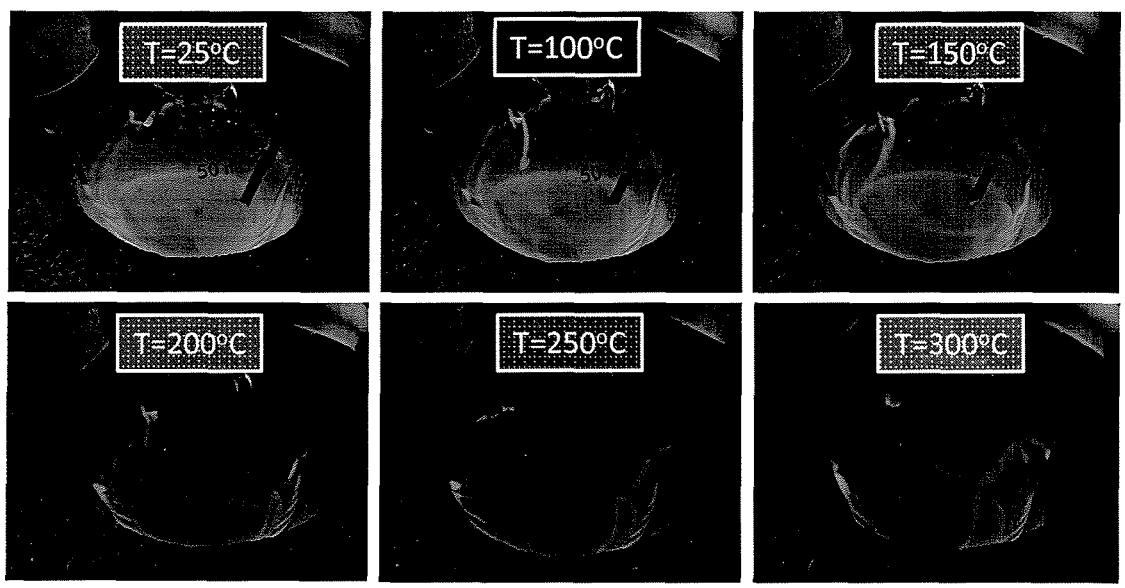
FIG. 10 represents digital pictures taken during heating of Cu:InP/ZnSe doped core/diffusion barrier nanocrystals according to one embodiment of the present invention.

Visually, the Cu:InP/ZnSe doped core/diffusion barrier nanocrystals did not show significant change on their dopant PL upon heating up to 150° C. while the reference InP/ZnSe quantum dots demonstrated an almost complete quenching of its bandgap PL [FIG. 7(a)]. The emission color of two samples also showed significant difference, with InP/ZnSe quantum dot PL color shifting to red and the Cu:InP/ZnSe doped core/diffusion barrier nanocrystal PL showing no noticeable variation upon heating. After heating up to 300° C., the emission intensity of the Cu:InP/ZnSe doped core/diffusion barrier nanocrystals also showed some noticeable decrease while the emission color did not change (FIG. 10). All of the changes, both InP/ZnSe quantum-dots shown at relatively low temperatures and Cu:InP/ZnSe doped core/diffusion barrier nanocrystals shown at high temperatures, were found to be reversible. When the samples were cooled down to room temperature, the emission color and intensity for both samples were recovered.

To verify these visual observations in a more quantitative manner, the PL spectra of both solution samples were also recorded at room temperature and 75° C. As shown in FIG. 7(b), the PL spectra of the Cu:InP/ZnSe doped core/diffusion barrier nanocrystals for both temperatures did not show significant difference. Conversely, the PL spectrum of the InP/ZnSe quantum dots showed a noticeable red-shift and substantial decrease of the PL intensity.

The results in FIG. 7 confirmed that the photoluminescence of the Cu:InP/ZnSe doped core/diffusion barrier nanocrystals was originated from the doping centers. The above results revealed that such a system still behaves more like pure dopant emission, instead of bandgap emission in terms of the temperature dependence. The outstanding thermal stability of the Cu:InP/ZnSe doped core/diffusion barrier nanocrystals further implied that these nanocrystals are more capable for some special technical applications than the corresponding undoped quantum dots are, for which high temperature is inevitable, such as solid state lighting, lasers, light-emitting diodes, etc.

Various embodiments of the invention have been described in fulfillment of the various objective of the invention. It should be recognized that these embodiments are merely illustrative of the principles of the present invention. Numerous modifications and adaptations thereof will be readily apparent to those of skill in the art without departing from the spirit and scope of the invention.

That which is claimed is:

1. A colloidal doped semiconductor nanocrystal comprising:
    a III/V host semiconductor material; and
    metal dopant, wherein the colloidal semiconductor nanocrystal has a dopant emission greater than about 620 nm, wherein the III/V host semiconductor material comprises InP, and wherein the metal dopant comprises Cu.

2. The doped semiconductor nanocrystal of claim 1 having a photoluminescence quantum yield of at least about 5%.

3. The doped semiconductor nanocrystal of claim 1 having substantially no bandgap emission from the III/V host semiconductor material.

4. The doped semiconductor nanocrystal of claim 1, wherein the metal dopant is incorporated into the lattice of the III/V host semiconductor material.

5. The doped semiconductor nanocrystal of claim 1, wherein the metal dopant is present in an amount of at least about 1 atomic weight percent.

6. The doped semiconductor nanocrystal of claim 1, wherein the metal dopant has a plurality of emission bands.

7. The doped semiconductor nanocrystal of claim 1 further comprising a diffusion barrier at least partially surrounding the III/V host semiconductor material.

8. The doped semiconductor nanocrystal of claim 7, wherein the diffusion barrier comprises a second semiconductor material.

9. The doped semiconductor nanocrystal of claim 8, wherein the second semiconductor material comprises 2 to 20 monolayers of ZnSe.

10. The doped semiconductor nanocrystal of claim 9, wherein the doped semiconductor nanocrystal has a size up to about 10 nm.

11. The doped semiconductor nanocrystal of claim 7 having a photoluminescence quantum yield of at least about 5%.

12. The doped semiconductor nanocrystal of claim 7, wherein the doped semiconductor nanocrystal has a size less than about 10 nm.

13. The doped semiconductor nanocrystal of claim 9, wherein the second semiconductor material comprises at least 3 monolayers of ZnSe and the dopant photoluminescent quantum yield is greater than 20%.

14. A method of producing colloidal doped semiconductor nanocrystals comprising:
    (a) combining a group III metal precursor, a ligand and a solvent to form a metal-ligand complex in a reaction vessel;
    (b) admixing an anionic precursor comprising a group V element with the metal-ligand complex at a first temperature sufficient to form colloidal host semiconductor nanocrystals comprising a III/V semiconductor material;
    (c) admixing a metal dopant with the host semiconductor nanocrystals to provide a reaction mixture; and
    (d) heating the reaction mixture to a second temperature to provide colloidal host semiconductor nanocrystals having the dopant dispersed therein,
    wherein the III/V semiconductor material comprises InP, and
    wherein the dopant comprises Cu.

15. The method of claim 14, wherein the first temperature ranges from about 180° C. to about 190° C.

16. The method of claim 14, wherein the second temperature ranges from about 175° C. to about 240° C.

17. The method of claim 16, wherein the reaction mixture is heated at a rate of at least about 2° C./minute.

18. The method of claim 14, wherein the doped semiconductor nanocrystals are substantially monodisperse.

19. The method of claim 14 further comprising forming a diffusion barrier comprising a material $M^1X^1$ on at least one of the doped semiconductor nanocrystals.

20. The method of claim 19, wherein forming the diffusion barrier comprising the material $M^1X^1$ on the at least one doped semiconductor nanocrystal comprises forming at least one monolayer of the material $M^1X^1$ on the at least one doped semiconductor nanocrystal by contacting the doped semiconductor nanocrystal, in an alternating manner, with a cation ($M^1$) precursor solution in an amount to form a monolayer of cation and an anion precursor ($X^1$) in an amount to form a monolayer of anion, wherein $M^1X^1$ comprises an inorganic solid selected from a group II/VI compound or a III/V compound.

21. The method of claim 19, wherein, prior to forming the diffusion barrier, the doped semiconductor nanocrystals have a dopant concentration of greater than 10% to about 20%, based on the total cations of a core of the doped semiconductor nanocrystals.

22. The method of claim 19, wherein the doped semiconductor nanocrystals have substantially no bandgap emission from the III/V host semiconductor material or the diffusion barrier.

23. The method of claim 19, wherein $M^1X^1$ comprises a II/VI compound.

24. The method of claim 23, wherein the II/VI compound comprises ZnSe.

25. The method of claim 21, wherein forming a diffusion barrier further comprises ejecting some metal dopant from the at least one semiconductor nanocrystal.

26. The doped semiconductor nanocrystal of claim 1 having a dopant emission in the near infrared region of the electromagnetic spectrum.

27. The method of claim 14, wherein the doped semiconductor nanocrystals have a dopant emission in the near infrared region of the electromagnetic spectrum.

* * * * *